United States Patent [19]

Fridman

[11] Patent Number: 4,992,811
[45] Date of Patent: Feb. 12, 1991

[54] FILM ADVANCING AND REWINDING MECHANISM

[75] Inventor: Vladimir Fridman, New City, N.Y.

[73] Assignee: Keystone Camera Corporation, Clifton, N.J.

[21] Appl. No.: 483,080

[22] Filed: Feb. 21, 1990

[51] Int. Cl.⁵ .............................................. G03B 1/12
[52] U.S. Cl. ................................ 354/173.1; 354/214; 242/71.6
[58] Field of Search ............... 354/173.1, 214, 215, 354/217, 218; 242/71.6

[56] References Cited

U.S. PATENT DOCUMENTS

| | | |
|---|---|---|
| 2,591,417 | 4/1952 | Frye. |
| 3,011,419 | 12/1961 | Takahama. |
| 3,057,277 | 10/1962 | Swarofsky et al. . |
| 3,459,110 | 8/1969 | Papke et al. . |
| 3,465,659 | 9/1969 | Sato. |
| 3,682,408 | 8/1972 | Sorimachi. |
| 4,021,828 | 5/1977 | Iura et al. . |
| 4,149,793 | 4/1979 | Date. |
| 4,312,581 | 1/1982 | Miyagawa et al. . |
| 4,416,525 | 11/1983 | Chan .................. 354/173.1 |
| 4,482,226 | 11/1984 | Tamamura ............ 354/173.1 |
| 4,492,446 | 1/1985 | Zawodny et al. . |
| 4,494,842 | 1/1985 | Kimura et al. . |
| 4,504,131 | 3/1985 | Kimura. |
| 4,516,843 | 5/1985 | Ohmura. |
| 4,564,279 | 1/1986 | Sitzler et al. . |
| 4,568,164 | 2/1986 | Sahori. |
| 4,839,687 | 6/1989 | Zawodny et al. . |

Primary Examiner—A. A. Mathews
Attorney, Agent, or Firm—Neuman, Williams, Anderson & Olson

[57] ABSTRACT

A motorized film winding and rewinding mechanism includes a take up drum for advancing a film and a motor to drive the take up drum. A spool for rewinding a film is connected to the take up drum through a series of gears so that it rotates in such a manner to allow transfer of film between the spool and the take up drum. A second system of gears that includes a floatable subgear system that moves between first and second positions connects the motor to the take up drum. A lever moves the floating subgears system from the first position to the second when the film reaches the end of the roll to change the path through the gear system and rotate the take up drum and spool in the opposite direction so that the motor rewinds the film.

20 Claims, 5 Drawing Sheets

FILM ADVANCING AND REWINDING MECHANISM

BACKGROUND OF THE INVENTION

1. Field of the Invention

The invention relates to a film advancing and rewinding mechanism for a camera, and more particularly to mechanical rewind apparatus that automatically rewinds a roll of film once it has reached the end of the roll.

2. Description of Prior Art

Film winding and rewinding operations are accomplished in a number of ways in prior art cameras. In manually operated winding systems the film is advanced frame by frame by the operator until the end of the film is reached. When the film will wind on no further, the operator must then rewind the film manually by rotating a handle that turns the spool axis inside the film cartridge.

In motor driven winding systems it is often the case that the film automatically rewinds after a number of exposures are taken. This number is preset when the film is inserted. This type of device although relatively simple is open to misuse. Firstly, the maximum number of exposures that can be taken on a film may be greater than the number of exposures stated on the packaging. By setting the number to be too small the photographer may waste exposures unnecessarily Secondly, the operator may incorrectly preset the number of exposures on the film. The use of this type of rewinding mechanism may also limit the length of film that could be used in the camera to those regularly available.

To provide a motorized mechanism that automatically rewinds a film when it reaches the end of the roll regardless of the number of exposures, prior art devices employ a number of contacts and electronic components to determine when the end of the film is reached and to trigger rewinding of the film.

SUMMARY OF THE INVENTION

This invention was evolved with the general object of improving upon film winding and rewinding mechanisms of the prior art, particularly with regard to obtaining reliable and trouble-free operation while minimizing expense of manufacture.

Important aspects of the invention relate to the discovery and recognition of sources of problems with prior art arrangements. One problem with prior art electronic automatic rewind cameras relates to the complexity of the electrical components and interconnections required in a motorized camera to detect when the end of a film is reached and to then energize a motor to rewind the film. It is found that automatic cameras of this type are not only subject to reliability problems but tend also to be quite expensive, the result being that automatic rewinding systems of this type are restrictive in application to automatic cameras toward the top end of the price range Manual control of rewinding and then loading another film may take an unacceptable length of time especially when the photographer is in a hurry to catch a particular event.

In accordance with this invention, a simple and inexpensive mechanical wind and rewind mechanism is provided which changes from wind to rewind automatically when the end of a roll of film is reached.

In accordance with important features of the invention, the film winding and rewinding mechanism includes a rotatable take-up member for advancing a film and a rotatable supply member for coupling to a supply spool and effecting rewinding of the film The take-up and supply members are coupled, as through suitable gears for example, to allow transfer of the film from each one to the other and a system of gears is provided which drives both members from a motor and which can operate either in a winding mode or a rewinding mode. To provide the two modes, a drive path through the gear system is changed from a first path to a second path upon reaching the end of a film.

Preferably, and in accordance with specific features of the invention, the gear system may include a floating gear sub-system which is movable to occupy first and second positions in order to establish the first and second paths respectively through the gearing system. The floating gear subsystem may include a first subgear and a second subgear. When the first path through the gear system is established, the first subgear is engaged with a second gear that forms part of the gear system and causes the system to rotate the first gear in the first direction. When the end of the film is reached, the first rotatable member stalls and the first subgear moves around the gear with which it is engaged urging the second subgear to an intermediate position A stop prevents the continued rotation of the first subgear around the second gear. Once the first subgear has moved to the stopped position a spring biased lever continues the movement of the second subgear disengaging it from the first subgear and moving it until it engages a third gear of the gear system to establish the second path through the gear system. In this path driving the first rotatable member causes the film to rewind.

BRIEF DESCRIPTION OF THE DRAWINGS

For a more complete understanding of this invention, reference should now be made to the embodiment illustrated in greater detail in the accompanying drawings and described by way of example only. In the drawings.

DESCRIPTION OF A PREFERRED EMBODIMENT

Figure 1:
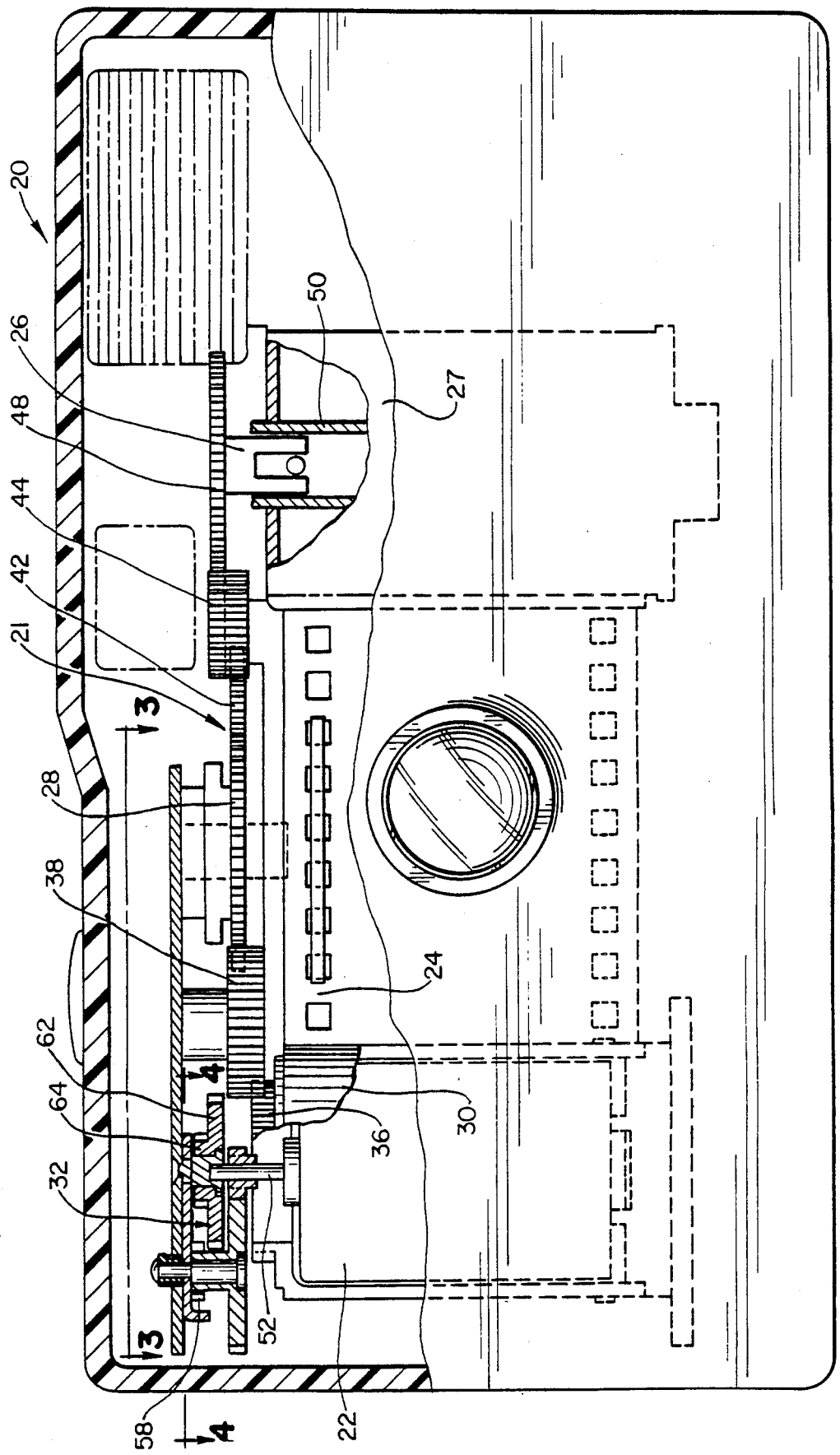
FIG. 1 is perspective front view of a camera cut away to show part of a rewind gearing mechanism.

In FIG. 1, reference numeral 20 generally designates a camera which is constructed in accordance with the principles of this invention and which includes a mechanical wind and rewind mechanism operative to change from wind to rewind automatically when the end of a roll of film is reached.

In FIG. 1, a portion of the front of the camera 20 has been cut away to show portions of a mechanism which advances and rewinds a film 24. The mechanism includes a first gearing system 21 which can be driven in either direction from a motor 22. The first gearing system 21 effects drive of a film 24 in either direction and is coupled to a spool drive member 26 which is arranged in a conventional manner to drivingly engage a supply spool 50 within a film cartridge 27. The first gearing system 21 is also coupled to a take-up drum 30 and is arranged to effect transfer of film in either direction, either from the spool coupled to the drive member 26 to the take-up drum 30, during winding of the film 24, or from the take-up drum 30 to the spool coupled to the drive member 26, during rewinding of the film.

The motor 22 drives the first gearing system through a second gearing system generally indicated 32 and described in greater detail later. The take up drum 30 is in surrounding relation to the motor 22 and carries a gear 36 that intermeshes with a first connecting gear 38 which may be arranged to show how many frames of the film 24 have been used (through means not shown). A cam (not shown) combined with the second connecting gear 28 and an electrical switch (not shown) stops the motor 22 after the film 24 has been advanced by one frame. The second connecting gear intermeshes with a third connecting gear 42 that intermeshes with a fourth connecting gear 44. This fourth connecting gear 44 engages a fifth connecting gear 48 that drives the spool drive member 26.

Figure 2:
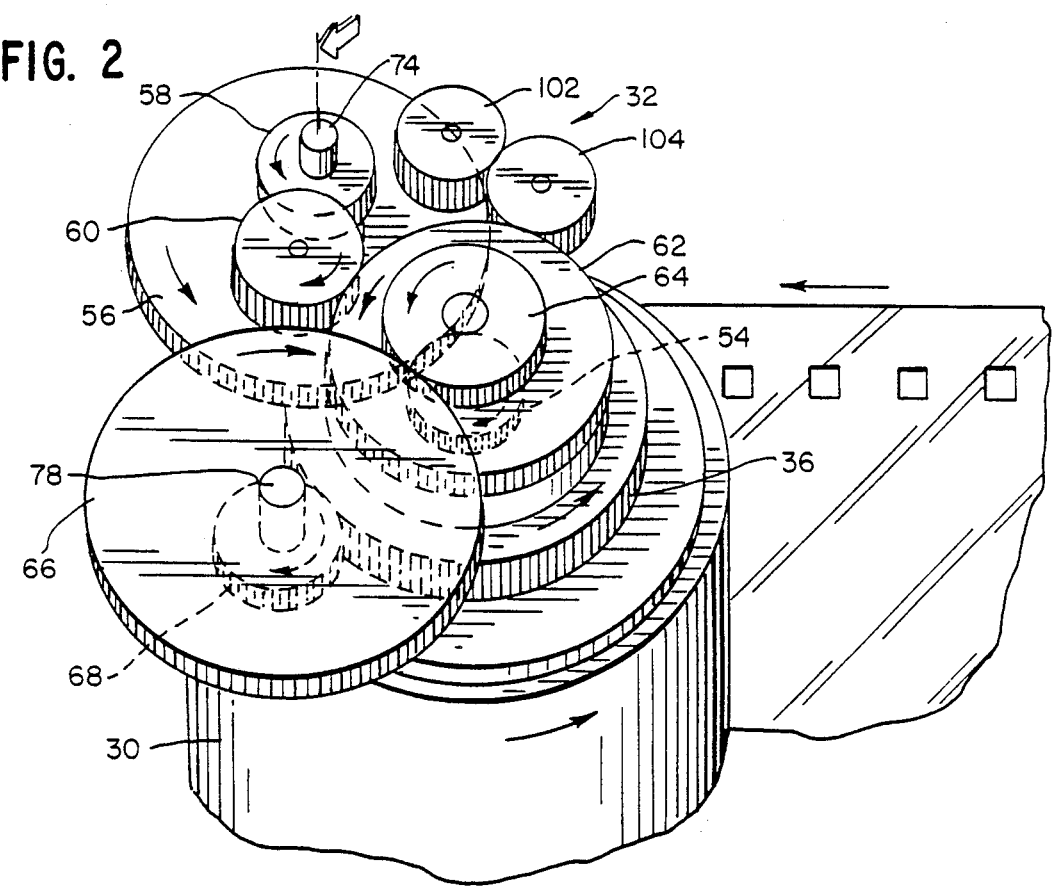
FIG. 2 is schematic representation of the gears of the rewind mechanism shown in the film advancing position.
Figure 6:
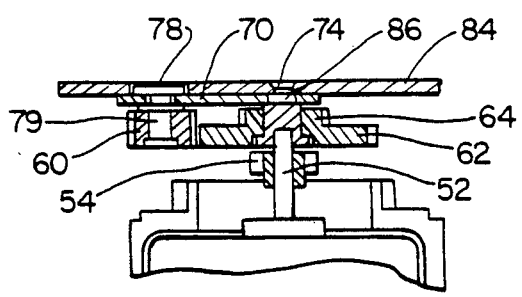
FIG. 6 is section through the camera of FIG. 1 along line 6—6 of FIG. 5.
Figure 7:
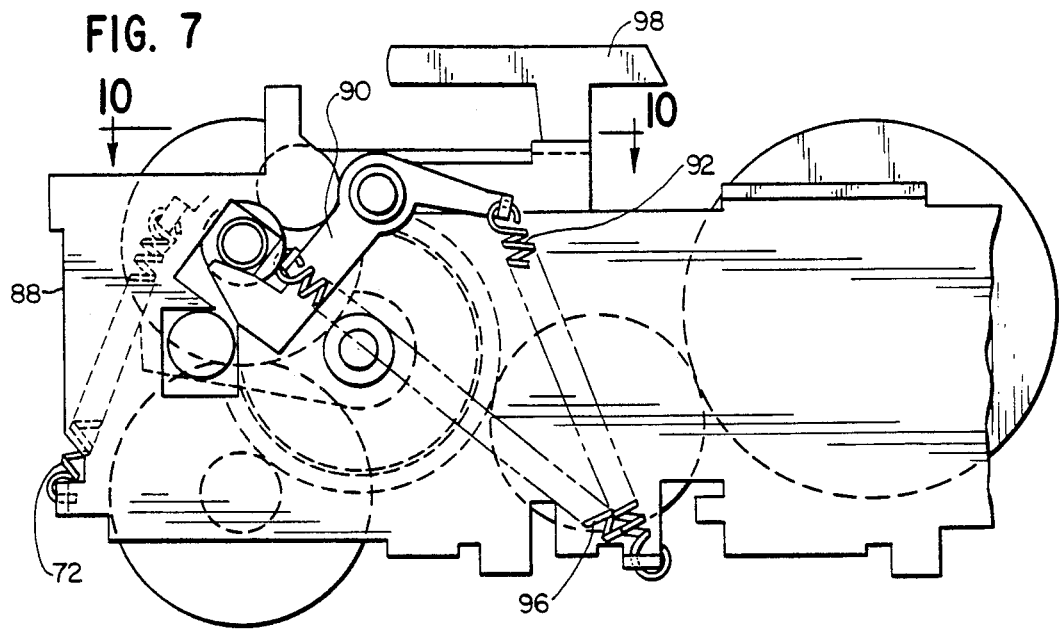
FIG. 7 shows the same view as FIG. 3 with the mechanism in the rewind position.
Figure 8:
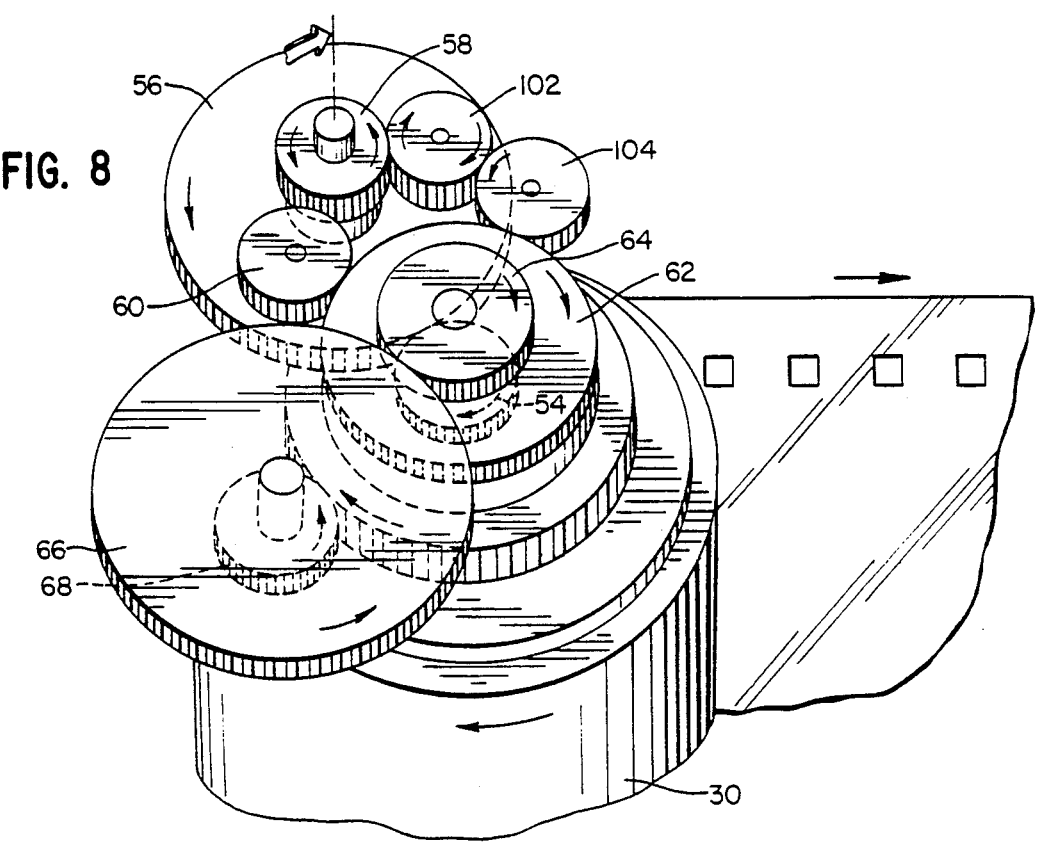
FIG. 8 is a schematic representation of the gearing arrangement in the rewind position.
Figure 9:
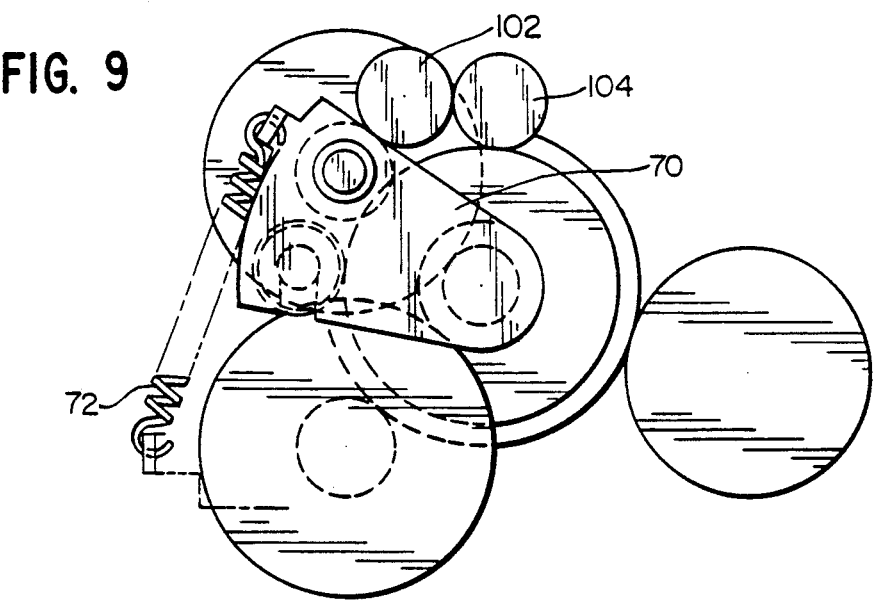
FIG. 9 is the view of FIG. 4 showing the mechanism in rewind position.

The second gearing system 32 that connects the motor 22 to the take up drum 30 can be seen in FIG. 2. This Figure shows the system 32 in the position in which film is advanced frame by frame. The motor 22 drives a shaft 52 (seen in FIGS. 1 and 6). The shaft 52 rotates a motor gear 54 that is engaged with the larger diameter wheel 56 of a first gear 56-58. The smaller diameter wheel 58 is engaged with a second gear 60. The second gear 60 engages the larger diameter wheel 62 of a third gear 62-64. The smaller diameter wheel 64 engages the larger diameter wheel 66 of a fourth gear 66-68. The smaller diameter wheel 68 engages the gear 36 on the take up drum 30. In the advance position, driving the motor in an anti-clockwise direction as depicted, rotates the take up drum 30 in a clockwise direction to wind on the film 24.

Figure 3:
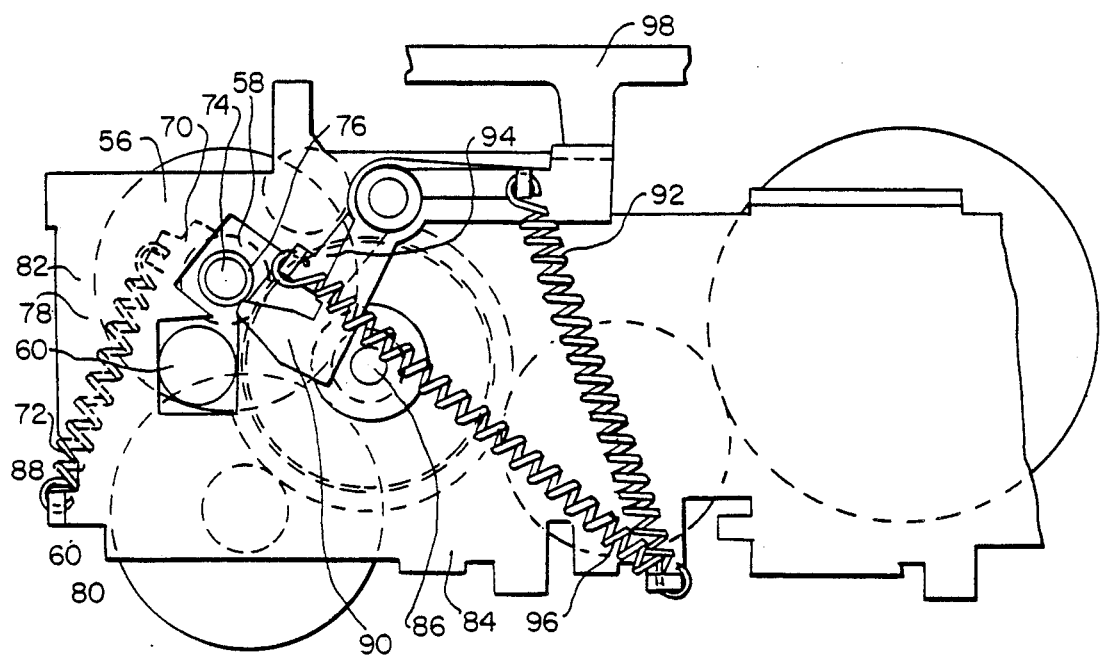
FIG. 3 is a schematic plan of the film advancing mechanism of the camera of FIG. 1 cut along line 3—3.
Figure 4:
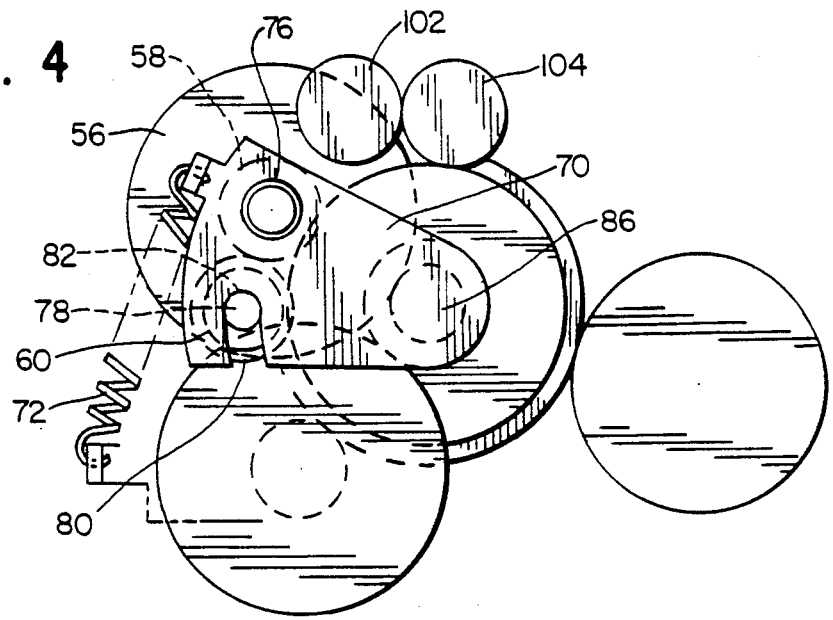
FIG. 4 is a plan view of the film advancing mechanism of FIG. 1 cut along line 4—4 when the mechanism is in the advance position.

Looking now at FIGS. 3 and 4, a plan view of the second gearing system 32 shown in FIG. 2 can be seen. A plate 70 is biased to the position it holds in the advance position by a first spring 72. This plate 70 can be seen best in FIG. 4. The first gear 56-58 is mounted on the plate 70 by a first stud 74 that has a roller 76. The second gear 60 is also mounted on the plate 70. The mounting is not, however, fixed and a second stud 78 has a neck portion 79 (seen best in FIG. 6) installed in a slot 80 in the plate 70. The slot 80 allows movement of the gear 60 relative to the plate 70 until the neck portion 79 reaches the end 82 of the slot 80. The plate 70 is mounted on a deck 84 seen in FIG. 6. The plate 70 is mounted to rotate relative to the deck 84 about pivot 86. The first and second studs 74 and 78 protrude through an aperture 88 in the deck 84 that allows movement of the first gear 56-58 and the second gear 60 relative to the deck 84.

The camera mechanism is moved from the advance to the rewind position by a lever 90 that is held in position by a second spring 92. The second spring 92 biases the lever 90 to exert pressure on the roller 76. The lever 90 is positioned so that when film is being advanced by the motor 22, the pressure exerted on the roller 76 by the lever 90 does not disturb the position of the plate 70 maintained by the first spring 72. Also seen in FIG. 3, is a reset lever 94 mounted on the deck 84 biased by a third spring 96. The reset lever 94 is attached at one end to a door 98 through which the film 24 is inserted and removed, and at the other end to the lever 90. As long as the film in the camera has not reached the end of the roll, the system of gears will remain in the position shown in FIGS. 2, 3 and 4.

Figure 5:
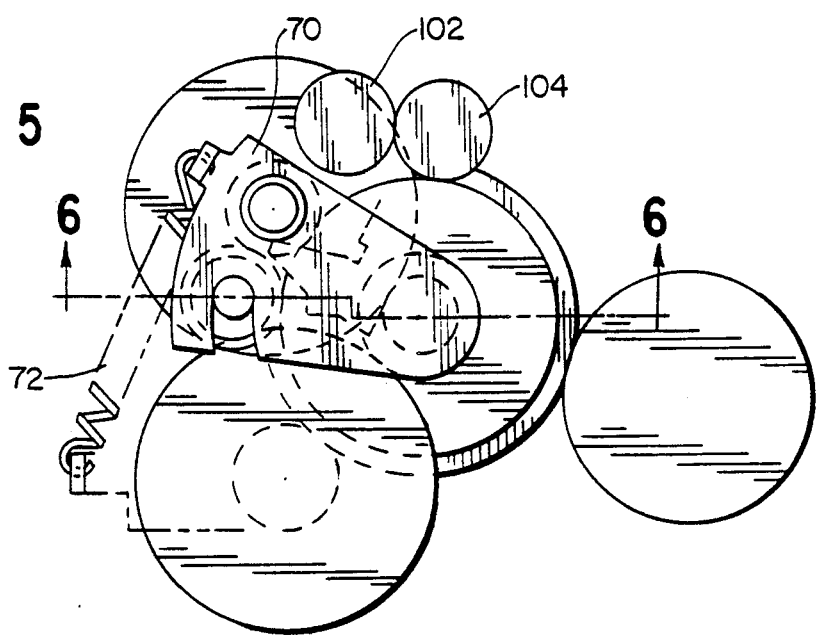
FIG. 5 is the view of FIG. 4 showing the mechanism in position intermediate advance and rewind.

When the film 24 has been advanced to its end, the take up drum 30 is restrained against further rotation by the film attached to supply spool 50. This leads to the fourth gear 66-68, and the third gear 62-64 are stalled along with the take up drum 30. The first gear 56-58, however, continues to rotate the second gear 60. This second gear 60 can no longer rotate the third gear 62-64 as it is stalled. The second gear 60, although unable to rotate the third gear 62-64, is free to rotate about the larger diameter wheel 62. This rotation comes to a halt when the neck portion 79 of the stud 78 that slidingly attaches the second gear 60 to the plate 70 reaches the end 82 of the slot 80 in which it is moving. As the second gear 60 rotates so does the first gear 56-58 with which it is intermeshed. The first gear 56-58 is thereby urged into the intermediate position of the system of gears, shown in FIGS. 5 and 6.

In the intermediate position, the first gear 56-58 has moved from the position it occupied in the advance position and the roller 76 has moved in relation to the lever 90. The new relative position of the roller 76 and the lever 90 allow the tension in the second spring 92 to urge the lever 90 to move the roller and first gear 56-58 from the intermediate position to the rewind position shown in FIGS. 7-10. As the roller is moved from the intermediate to the rewind position, the first gear 56-58 is disengaged from the second gear 60 and moved to a position in which it engages with a fifth gear 102. This fifth gear is in turn intermeshed with a sixth gear 104 that is engaged with the third gear 62-64.

The movement of the first gear from the advance to the rewind position, changes the path through the gear system 32 from a first path established in the advance position to a second path utilized in the second position. In the second path the motor gear 54 drives the first gear 56-58 as in the first path. Instead, however, of the first gear 56-58 driving the second gear 60, the first gear 56-58 engages and rotates the fifth gear 102. The fifth gear 102, rotates the sixth gear 104 which intermeshes with the larger diameter wheel 62 of the third gear 62-64. The route taken between the motor gear 54 and the third gear in the rewind includes one more gear than the route taken in the advance position and as a consequence the third wheel in the rewind position rotates in the opposite direction to that in which it rotates in the advance position. The third gear 62-64 rotates the fourth gear 66-68 that in turn rotates the take up drum 30. As the third gear 62-64 is rotated in the opposite direction so too are the fourth gear 66-68 and the take up drum 30. The take up drum 30, although stalled with respect to further advancement of film, is free to rotate along with the third and fourth gears 62-64 and 66-68 in the opposite direction to rewind film from the take up drum 30 to the supply spool 50.

Although, in the configuration described above, the take up drum 30 has been rotated in the opposite direction by altering the number of gears in the two paths between the motor gear and the take up drum by one, any odd number difference in the number of gears in the paths taken in the advance and rewind positions between the motor gear and the take up drum would produce the same result.

Figure 11:
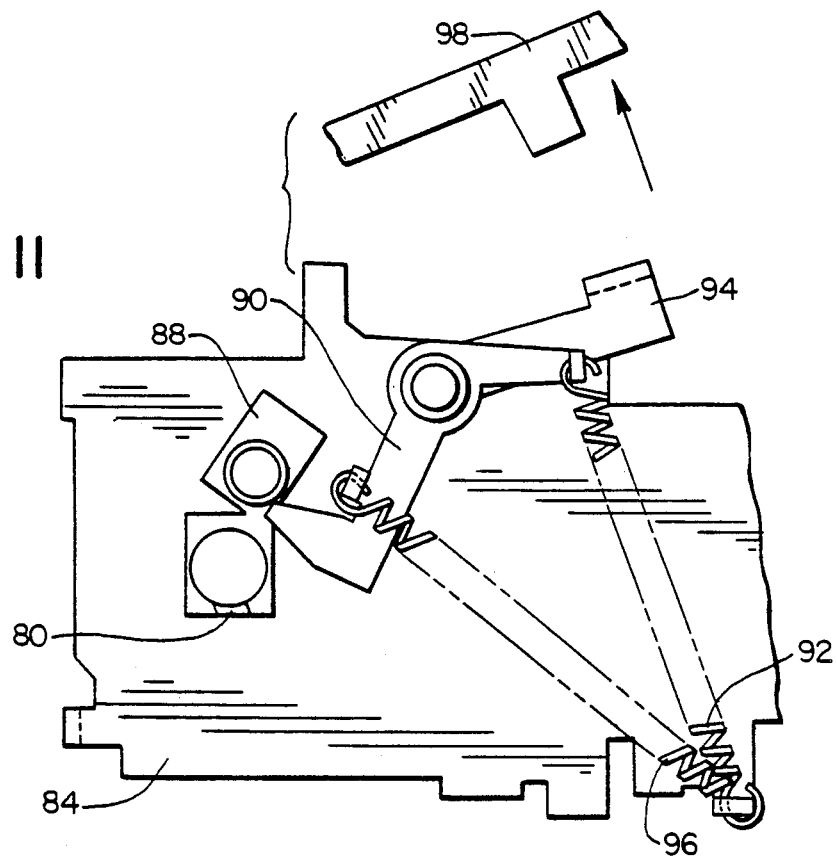
FIG. 11 shows the same view as FIG. 3 showing the mechanism when the camera door is open.
Figure 10:
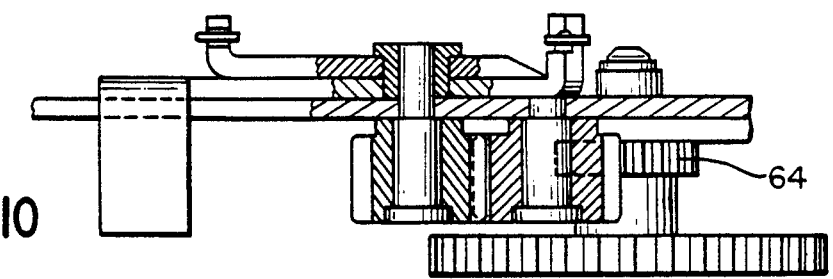
FIG. 10 is a section through the camera of FIG. 1 along line 10—10 of FIG. 7 in the rewind position.

In the rewind position, the gears connecting the take up drum 30 with the supply spool 50 rotate the rewind shaft in the same direction as the take up drum 30. This rotation winds the film back into the film cartridge 27 withdrawing it from the take up drum 30. The motor 22 continues to rotate until the film is completely rewound. At this stage the camera operator is free to remove the film from the camera through the door 98. When the door 98 is opened as in FIG. 11, the reset lever 94, under pressure from the third spring 96 which is stronger than the second spring 92, moves the lever 90 away from contact with the roller 76. The plate 70 is then returned to its initial position under tension of the first spring 72. The gear system is thereby returned to the advance position shown in FIGS. 2, 3 and 4 each time the camera door 98 is opened.

The simplicity of the mechanical arrangement for rewinding film enables a camera of this invention to be cheap relative to those employing expensive electronic components to obtain the same results. In addition, the parts utilized in this invention do not experience a great deal of wear during operation and therefore allow the camera to be durable.

While one preferred embodiment of this invention is illustrated, it will be understood, of course that the invention is not limited to this embodiment. Those skilled in the art to which the invention pertains may make modifications and other embodiments employing the principles of the invention, particularly upon considering the foregoing teachings.

What is claimed is:

1. A film winding and rewinding mechanism for a camera in which the mechanism automatically switches from wind to rewind when the end of a film is reached, comprising:
   a rotatable take up member for advancing a film;
   a rotatable supply member for supporting the film and affecting rewinding of the film;
   first mechanical coupling means for coupling to said rotatable take up member and to said rotatable supply member to allow transfer of the film from one said rotatable member to the other;
   a motor mechanism;
   second mechanical coupling means coupled to said motor and to said first mechanical coupling means, said second mechanical coupling means having two modes of operation, a first mode which results in transfer of said film from said supply member to said take up member, and a second mode which results in transfer of said film from said take up member to said supply member; and
   mechanical means for changing the mode of operation of said second mechanical coupling means from said first to said second mode of operation in response to a completion of advancement of the film from the supply member to the take up member.

2. The mechanism of claim 1 wherein said first mechanical coupling means includes a first gear and said second mechanical coupling system comprises a system of gears.

3. The mechanism of claim 2 wherein said means for changing the mode of operation of said second mechanical coupling means comprises mechanical means to change the path through said gearing system.

4. A film winding and rewinding mechanism for a camera in which the mechanism automatically switches from wind to rewind when the end of a film is reached, comprising:
   a rotatable take up member for advancing a film;
   a rotatable supply member for supporting the film and affecting rewinding of the film;
   means for coupling rotation of said rotatable take up member to rotation of said rotatable supply member to allow transfer of the film from one said rotatable member to the other, including a first gear;
   a system of gears for driving said first gear; and
   mechanical means to change the path through said system of gears from a first path in which said first gear rotates in a first direction, to a second path in which said first gear rotates in a second direction opposed to said first direction, in response to a completion of advancement of the film from the supply member to the take up member.

5. The mechanism of claim 4 wherein said system of gears comprises a floating gear subsystem movable to occupy first and second positions for establishing said first and second paths respectively through said gearing system.

6. The mechanism of claim 5 wherein said floating gear subsystem comprises first and second subgears, said first subgear engaging a second gear in said system of gears in said first position to establish said first path through said system of gears and said second subgear engaging a third gear in said system of gears in said second position to establish said second path.

7. The mechanism of claim 6 wherein on completion of film advancement said second gear stalls in its direction of rotation allowing said first subgear to rotate about said second gear from a first location to a second location thereby arranging said floating subsystem in a third position intermediate said first and second positions.

8. The mechanism of claim 5 wherein said mechanical means comprises a spring biased lever for moving said second subgear from said second location to a position for engagement with said third gear.

9. The mechanism of claim 8 further comprising a plate attached to said second subgear, rotatable about a pivot and having a slot to allow movement of said first subgear relative to said plate from said first to said second position and halt movement of said first subgear beyond said second position.

10. The mechanism of claim 8 further comprising a roller attached to said second subgear in contact with said spring biased lever.

11. A camera having a mechanism for advancing and rewinding film comprising:
    a rotatable take up member for advancing film;
    a rotatable supply member for supporting the film and affecting rewinding of the film;

means for coupling rotation of said rotatable take up member to rotation of said rotatable supply member to allow transfer of the film from one said rotatable member to the other, including a first gear;

a system of gears in driving relation with said first gear; and mechanical means to change the path through said system of gears from a first path in which said first gear rotates in a first direction to a second path in which said first gear rotates in a second direction opposed to said first direction on completion of advancement of the film from said supply member to said rotatable take up member.

12. The camera of claim 11 wherein said system of gears comprises a floating gear subsystem movable to occupy first and second positions for establishing said first and second paths respectively through said gearing system.

13. The camera of claim 12 wherein said floating gear subsystem comprises a first subgear and a second subgear, said first subgear engaging a second gear of said gear system in said first position and said second subgear engaging a third gear of said gear system in said second position.

14. The camera of claim 13 wherein said second gear stalls on complete advancement of a film permitting said first subgear to travel around said second gear from a first location to a second location 15. The camera of claim 13 wherein rotation of said first subgear about said second gear causes movement of said second subgear from an initial to an intermediate position.

16. The camera of claim 15 wherein said mechanical means comprises means for moving said second subgear from said intermediate position to a final position engaging said third gear.

17. The camera of claim 16 wherein said means for moving said second subgear comprises a spring biased lever.

18. The camera of claim 14 further comprising a plate attached to said second subgear, rotatable about a pivot and having a slot to allow movement of said first subgear relative to said plate from said first to said second location and halt movement of said first subgear beyond said second location 19. The mechanism of claim 14 further comprising means to drive said system of gears.

20. The mechanism of claim 19 wherein said means for driving said system of gears is an electrical motor.

* * * * *